US009483982B1

(12) United States Patent
Reddy et al.

(10) Patent No.: US 9,483,982 B1
(45) Date of Patent: Nov. 1, 2016

(54) APPARATUS AND METHOD FOR TELEVISION BACKLIGNTING

(71) Applicants: Rakesh Reddy, Boca Raton, FL (US); Mary K. Reddy, Boca Raton, FL (US)

(72) Inventors: Rakesh Reddy, Boca Raton, FL (US); Mary K. Reddy, Boca Raton, FL (US)

(73) Assignee: DREAMSCREEN LLC, Boca Raton, FL (US)

( * ) Notice: Subject to any disclaimer, the term of this patent is extended or adjusted under 35 U.S.C. 154(b) by 0 days.

(21) Appl. No.: 14/970,784

(22) Filed: Dec. 16, 2015

Related U.S. Application Data

(60) Provisional application No. 62/157,069, filed on May 5, 2015.

(51) Int. Cl.
G09G 5/10 (2006.01)
H04N 5/44 (2011.01)
G09G 3/34 (2006.01)
H04N 5/57 (2006.01)

(52) U.S. Cl.
CPC .............. *G09G 3/3406* (2013.01); *G09G 5/10* (2013.01); *H04N 5/4403* (2013.01); *H04N 5/57* (2013.01); *G09G 2320/0626* (2013.01)

(58) Field of Classification Search
CPC .................. G09G 3/3406; G09G 5/10; G09G 2320/0626; H04N 5/57; H04N 5/4403
See application file for complete search history.

(56) References Cited

U.S. PATENT DOCUMENTS

| 5,790,096 | A * | 8/1998 | Hill, Jr. | G09G 5/005 345/600 |
| 7,209,180 | B2 * | 4/2007 | Takagi | H04N 7/0122 348/445 |
| 7,616,262 | B2 * | 11/2009 | Eves | H04N 5/64 348/552 |
| 7,861,257 | B2 * | 12/2010 | Park | H04N 21/4532 348/836 |
| 7,894,000 | B2 * | 2/2011 | Gutta | G06T 7/408 348/553 |
| 7,924,254 | B2 * | 4/2011 | Hsu | G09G 3/3406 345/102 |
| 8,130,330 | B2 | 3/2012 | Tan et al. | |
| 8,237,688 | B2 * | 8/2012 | Huang | G06T 5/009 345/102 |
| 8,587,204 | B2 | 11/2013 | Matthys | |
| 8,787,543 | B2 | 7/2014 | Peregrin Emparanza et al. | |
| 8,964,123 | B2 * | 2/2015 | Nakashima | H04N 21/42202 345/102 |
| 9,214,112 | B2 * | 12/2015 | Yamashita | G02F 1/1336 |
| 9,235,257 | B2 * | 1/2016 | Richardson | G06F 1/325 |
| 2004/0012556 | A1 * | 1/2004 | Yong | G06F 3/0202 345/102 |
| 2005/0184952 | A1 * | 8/2005 | Konno | G09G 3/3426 345/102 |
| 2006/0139270 | A1 * | 6/2006 | Hong | G09G 3/3406 345/87 |
| 2007/0001993 | A1 * | 1/2007 | Koizumi | H05B 41/2983 345/101 |
| 2007/0126864 | A1 | 6/2007 | Bhat et al. | |

(Continued)

OTHER PUBLICATIONS

SCIMO, connection examples, http://www.keiang.de/Content-pid-58.html, pp. 1-7.

*Primary Examiner* — Brian Yenke
(74) *Attorney, Agent, or Firm* — Glenn E. Gold, P.A.; Glenn E. Gold

(57) ABSTRACT

A television backlighting apparatus includes an HDMI splitter for splitting a single input HDMI signal into two like output HDMI signals. A video frame analyzer is communicative with one of the HDMI outputs and has a processor executing an instruction set for analyzing the HDMI signal. The analysis converts boundary video values of the HDMI signal to an LED illumination data signal and an LED light source output. An LED light source is attachable to a television and is communicative with the video frame analyzer via the LED light source output. The light source includes at least one LED light and an LED interface cable interconnected with the video frame analyzer and extending from the LED light source output to the at least one LED light.

20 Claims, 6 Drawing Sheets

(56) References Cited

U.S. PATENT DOCUMENTS

| | | | |
|---|---|---|---|
| 2007/0183678 A1* | 8/2007 | Sankar | G06F 3/14 382/254 |
| 2008/0129662 A1 | 6/2008 | Yoo et al. | |
| 2008/0316167 A1* | 12/2008 | Kurokawa | G09G 3/3406 345/102 |
| 2009/0002564 A1* | 1/2009 | Barnhoefer | G09G 3/3406 348/687 |
| 2009/0106663 A1* | 4/2009 | Pirie | G06Q 30/02 715/744 |
| 2009/0109232 A1* | 4/2009 | Kerofsky | G09G 3/3406 345/589 |
| 2009/0123086 A1 | 5/2009 | Iwanami et al. | |
| 2009/0135208 A1* | 5/2009 | Miura | G03B 21/00 345/690 |
| 2009/0219243 A1* | 9/2009 | Chen | G09G 3/3406 345/102 |
| 2009/0268105 A1* | 10/2009 | Kohashikawa | G09G 3/3406 348/790 |
| 2009/0289874 A1* | 11/2009 | Ha | H04N 7/0122 345/1.3 |
| 2010/0050228 A1* | 2/2010 | Kawashima | H04N 21/43632 725/151 |
| 2010/0295767 A1* | 11/2010 | Lee | G09G 3/3426 345/102 |
| 2011/0161478 A1 | 6/2011 | Formo et al. | |
| 2011/0246202 A1* | 10/2011 | McMillan | G10L 19/018 704/270 |
| 2012/0050334 A1 | 3/2012 | Velthoven et al. | |
| 2012/0057078 A1* | 3/2012 | Fincham | H04N 5/57 348/645 |
| 2012/0075353 A1* | 3/2012 | Dong | H04N 5/58 345/690 |
| 2012/0090001 A1* | 4/2012 | Yen | H04N 21/43632 725/37 |
| 2012/0120471 A1* | 5/2012 | Hamalainen | G09F 3/0297 359/238 |
| 2012/0242250 A1 | 9/2012 | Coezijn et al. | |
| 2013/0061271 A1* | 3/2013 | Lu | H04L 12/2838 725/74 |
| 2013/0120660 A1* | 5/2013 | Akita | G02F 1/13306 348/687 |
| 2013/0182068 A1* | 7/2013 | Cheng | H04N 13/0055 348/43 |
| 2013/0250171 A1* | 9/2013 | Francis | H04N 5/44 348/461 |
| 2013/0278171 A1* | 10/2013 | Ascorra | H05B 33/0842 315/294 |
| 2014/0009513 A1* | 1/2014 | Noutoshi | H04N 5/57 345/690 |
| 2014/0229970 A1* | 8/2014 | Besehanic | H04H 60/43 725/20 |
| 2014/0253606 A1* | 9/2014 | Yun | G02B 5/0278 345/690 |
| 2014/0267466 A1* | 9/2014 | Takagi | G09G 3/36 345/691 |
| 2014/0354827 A1* | 12/2014 | Nakashima | H04N 21/42202 348/177 |
| 2015/0042884 A1* | 2/2015 | Shimura | G09G 3/3406 348/687 |
| 2015/0172392 A1 | 6/2015 | Jean et al. | |
| 2015/0296247 A1* | 10/2015 | Glasser | H04L 65/4084 725/74 |

\* cited by examiner

130 Video Frame Analyzer
132 Enclosed Chassis
134 HDMI Input
136 Microprocessor
137 Memory Device
138 Power/Mode Select Button
140 Status Light
142 Back Light Zone/Color Selector
144 Brightness Selector
146 LED Light Source Output
148 Power Input 104 Television
105 Rear Surface
130 Video Frame Analyzer
160 Light Source
162 LED Light Strips
164 LED Interconnect Cables
168 Position Sensor 104 Television
180 Front Screen
182 Top Black Bar
184 Bottom Black Bar
186 Upper Boundary
188 Lower Boundary
190 Left Side Boundary
192 Right Side Boundary

APPARATUS AND METHOD FOR TELEVISION BACKLIGNTING

CROSS-REFERENCE TO RELATED APPLICATION

This U.S. utility non-provisional patent application claims the benefit of U.S. provisional patent application No. 62/157,069 filed on May 5, 2015, which is incorporated-by-reference herein in its entirety.

FIELD OF THE INVENTION

The present disclosure generally relates to apparatuses and methods for backlighting of televisions. More particularly, the present disclosure relates to an apparatus and method for analyzing an HDMI video signal and adjusting television backlighting in response to the analysis results.

BACKGROUND OF THE INVENTION

Watching television for many people is in every day pastime and often a form of nightly entertainment. Oftentimes, individuals watching television programs will experience undesired glare from lighting in the room. They may turn off all room lighting to eliminate this glare, or alternatively just prefer to watch television in a dark room. However, viewing television on regular settings in an unlit room is actually too bright for a person's eyes. Individual's eyes tend to adjust to the dark room around the television and not the television itself, therefore making the television screen excessively bright and even painful to watch. Movie theaters, for the same reason do not even completely dim the house lights. When the lights dim after previews, the house lights will still stay on reasonably bright in order to reduce the contrast between the lit screen and the surrounding room.

As a result, television backlighting has become increasingly popular. Some of the benefits of backlighting include the minimization of annoying glare on the screen, maintaining sufficient visibility in the room to navigate around furniture, and improved sharpness of the picture because one's eyes can focus more easily. Such backlighting can range from simply placing a lit incandescent light behind the television to various methods allowing for dynamic control of the backlighting. RGB LEDs (red-green-blue light emitting diodes) have been used in various ways to backlight a television. As a static color, RGB LEDs have been used to improve the ambience of a television. Dynamically adjusted lights have also been used to allow the LEDs to respond to the image on the television as a backlighting method to enhance the viewing experience of televisions.

In these more sophisticated methodologies, the video stream broadcasted to the television is analyzed and a computer (or similar processing circuitry) is used to calculate the values that are written to the LEDs. Some televisions have backlighting systems installed within the product during manufacture while other techniques have used a computer system (such as a personal computer) to calculate and broadcast these values. In these cases, the technique utilized output devices of computers or a second processing unit to affect the backlighting experience.

The most common means of transmitting a signal to a current technology digital television set is via the use of High-Definition Multimedia Interface (HDMI). HDMI is a proprietary audio/video interface for transferring uncompressed video data and compressed or uncompressed digital audio data from an HDMI-compliant source device to a compatible computer monitor, video projector, digital television, or digital audio device. HDMI is a digital replacement for analog video standards and can now be found on virtually all flat-panel video displays, cable television set-top boxes, and Blu-ray players. The HDMI cabling interconnecting video sources to displays is standardized.

However, existing methodologies for analyzing a video signal do so by analyzing the video signal and then passing the video signal to the television. Therefore, an apparatus and method for analyzing the video signal and controlling backlighting in response thereto without interrupting the HDMI video signal to the television is needed.

SUMMARY OF THE INVENTION

The present disclosure is generally directed to a television backlighting apparatus for customized backlighting of a television set. The television backlighting apparatus includes a High-Definition Multimedia Interface (HDMI) splitter for splitting a single input HDMI signal into two like output HDMI signals and has an HDMI signal input and at least a first HDMI output for connection to a television and a second HDMI output for a second of said HDMI signals. A video frame analyzer is communicative with the second HDMI output and has a processor executing an instruction set for analyzing the second HDMI signal. The analysis converts boundary video values of the HDMI signal to a Light Emitting Diode (LED) illumination data signal and an LED light source output. An LED light source is attachable to a television and is communicative with the video frame analyzer via the LED light source output. The light source includes at least one LED light and an LED interface cable interconnected with the video frame analyzer and extending from the LED light source output to the at least one LED light.

In another aspect, the light source may include a plurality of LED light strips arranged in close proximity to the television, and optionally disposed peripherally about the television. Optionally, the LED light strips may be attached to the television.

In still another aspect, each LED light strip may be located in a unique zone.

In yet another aspect, each LED light strip may be directly connected to the video frame analyzer.

In a still further aspect, the LED light strips may be interconnected in series.

In another aspect, the light source may be communicative with the video frame analyzer and communicate, to the analyzer, a number and zone placement of each LED light strip.

In another aspect, the video frame analyzer may command a different color to each of the LED light strips.

In a still further aspect, the light source may further include at least one sensor to identify the zone position of each LED light strip.

In yet another aspect, the light source may further include a memory device for storing the number of zones, wherein the zone may serve a predetermined section of backlighting.

In another aspect, the memory may be non-volatile and retain apparatus settings when power is removed from the backlighting apparatus.

In still another aspect, the video frame analyzer may include manual controls for manually selecting a color and intensity setting for the LED light strips independent of the HDMI signal stream.

In yet another aspect, the video frame analyzer may include a wireless communication function communicative with a remote device for controlling user interface functions of the backlighting apparatus.

In another aspect, a method for backlighting a television set includes the steps of acquiring a backlighting apparatus of the type including a High-Definition Multimedia Interface (HDMI) splitter for splitting a single input HDMI signal into two like output HDMI signals, a video frame analyzer connected to one of the output HDMI signals for converting boundary video values of the HDMI signal to a Light Emitting Diode (LED) illumination data signal and an LED light source attached to the back of a television and interconnected to the video frame analyzer. An HDMI television signal is received by the splitter and is split into a first HDMI signal and an identical second HDMI signal. The first HDMI signal is routed to the television, and the second HDMI signal is routed to the video frame analyzer. The second HDMI signal is analyzed and the boundary video values of the second HDMI signal are converted to an LED illumination data signal. The LED illumination data signal is then output to the LED light source.

In still another aspect, the method further includes after the analyzing step, the step of computing the backlight color from the color of the border of the television screen.

In yet another aspect, the method further includes after the analyzing step, the step of identifying letterboxing of a widescreen data stream in the video signal.

In a still further aspect, the method further includes after the identifying step, the step of automatically redefining the sections of the video signal used to compute the backlight color to that of the border of the visual content of the widescreen data stream.

In another aspect, the method further includes after the identifying step, the step of manually initiating redefinition of the backlight color computation to that of the sections of the video signal from the border of the visual content of the widescreen data stream.

In another aspect, the method further includes after the converting step, the step of correcting the backlight color to compensate for the existing color of the surface on which the backlight illumination occurs.

In a still further aspect, the video frame analyzer includes an instruction set to analyze an audio stream of the HDMI signal and wherein the converting step includes converting the audio stream to visual colors and intensities.

In yet another aspect, the analyzing step includes use of Fast Fourier Transforms to analyze the spectrum of the audio stream and wherein the converting step includes creating color schemes responsible to frequencies and energy in the audio signal.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
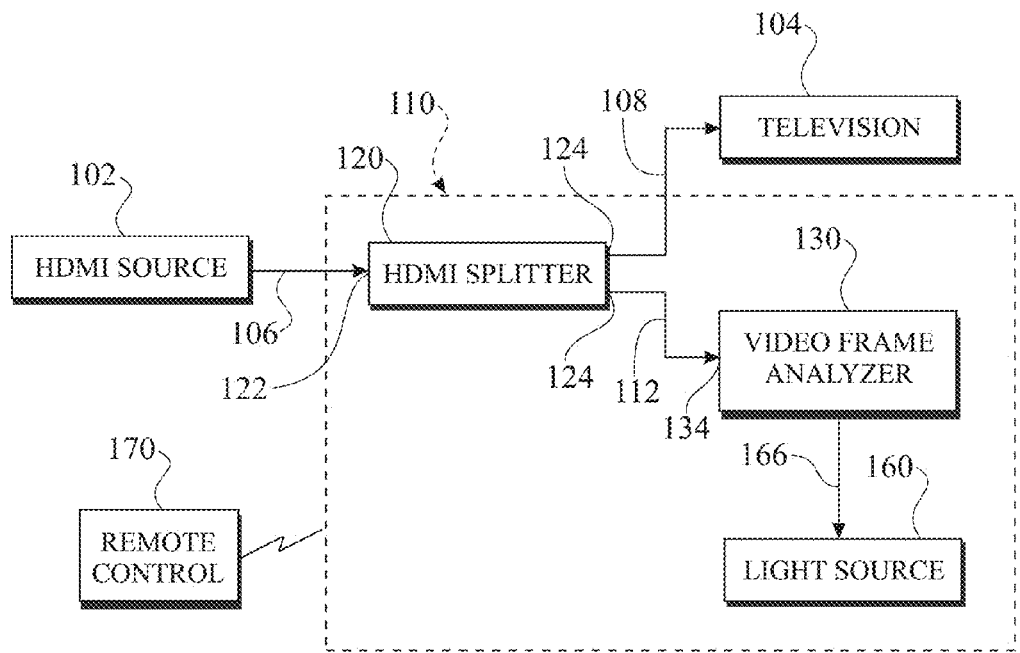
FIG. 1 presents a block diagram of a television backlighting apparatus for customized backlighting of a television set embodying the present invention.
Figure 2:
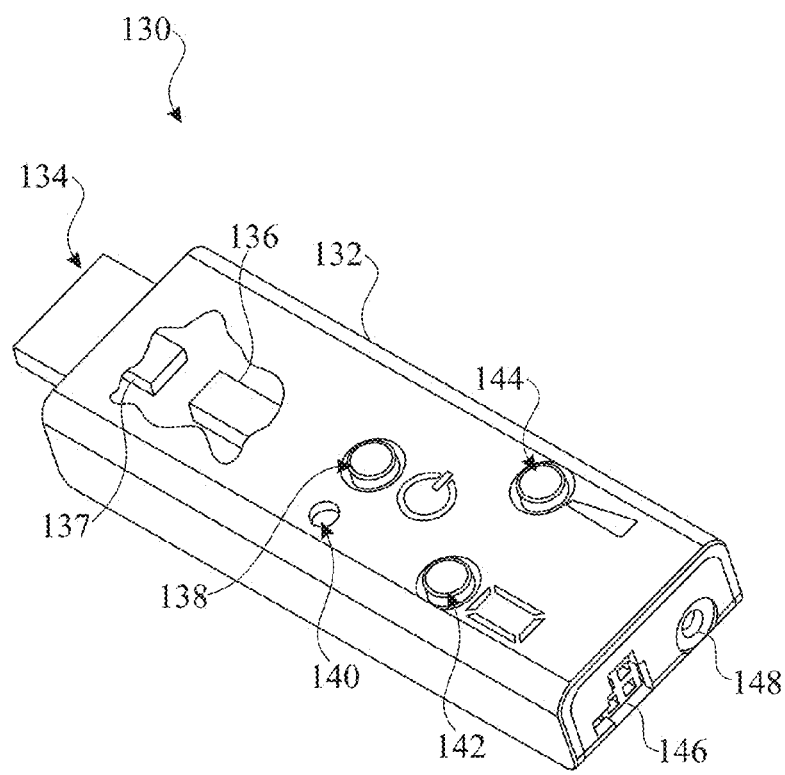
FIG. 2 presents an isometric view of an embodiment of a video frame analyzer according to the present invention.

In one exemplary implementation of the invention, a television backlighting apparatus 110 is shown in FIGS. 1-2 illustrating its various components. The television backlighting apparatus 110 is intended for use in conjunction with a television 104 compatible with receiving a High-Definition Multimedia Interface (HDMI) data stream from an HDMI source 102. The HDMI source 102 is typically a cable TV set-top box, a Blu-ray player, a media player, a gaming console, or other device capable of outputting an HDMI video and audio signal.

The television backlighting apparatus 110 includes an HDMI splitter 120 having an HDMI input 122 which is connected to the HDMI source 102 with an HDMI cable 106. The HDMI signal received at HDMI input 122 is broken into two identical HDMI signals which are directed to the dual HDMI outputs 124. A first HDMI output 124 is connected via HDMI cable 108 with the television 104 wherein the television 104 converts the HDMI signal into a visual display and corresponding audio presentation. Optionally, the HDMI content may be incorporate a form of digital copy protection such as High-bandwidth Digital Content Protection (HDCP) to prevent copying of digital and video content as it travels across connections. In that case, the HDMI splitter 120 may provide HDCP content at the HDMI outputs 124, the HDMI cable 108 and the HDMI input signal 112. Accordingly, video encryption may be carried through from the video source to the HDMI outputs 124, the HDMI cable 108 and the HDMI input signal 112.

A second of the HDMI outputs 124 from the HDMI splitter 120 is connected via an HDMI input 134 to a video frame analyzer 130 to deliver HDMI signal output from the HDMI splitter as an analyzer HDMI input signal 112. The video frame analyzer 130 then processes the analyzer HDMI input signal 112 to create a Light Emitting Diode (LED) illumination data signal which is transmitted to a light source 160 via a light source interface cable 166.

Figure 3:
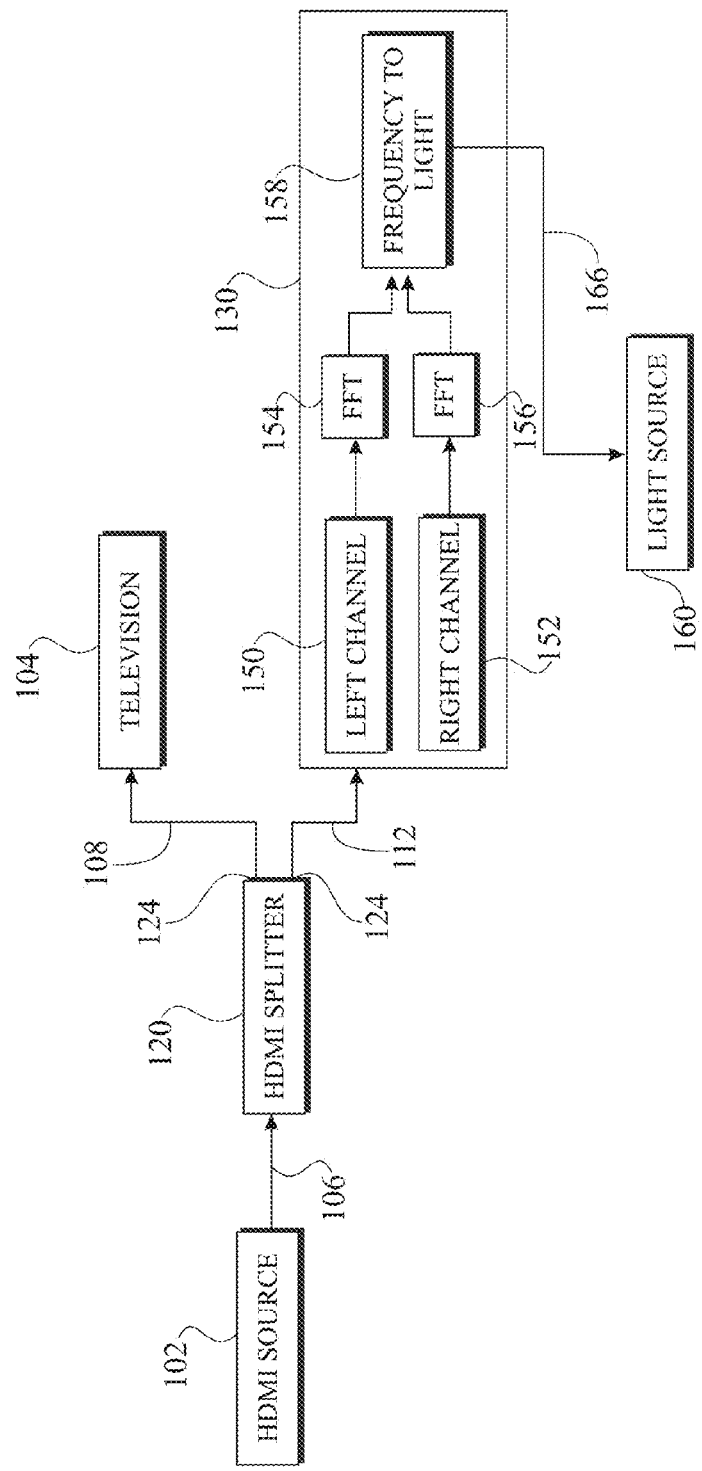
FIG. 3 presents a block diagram of an audio function wherein the HDMI audio stream is converted to an LED light control signal.

As illustrated in FIG. 2, the video frame analyzer 130 has an enclosed chassis 132 in which the operational electronics are housed including a microprocessor 136 for analyzing the HDMI input signal and a memory device 137 for storing executable instruction sets utilized by the microprocessor 136 for analyzing the signals. The video frame analyzer 130 also includes an HDMI input 134 and an LED light source output 146. When the video frame analyzer 130 is configured as a stand-alone component, a power input 148 can be provided for connection to an external power source (not shown). The video frame analyzer 130 can also include one or more manual controls. A power/mode select button 138 can be utilized for on/off selection and for selecting one of a plurality of operational modes. A back light zone/color selector 142 can be utilized to manually select colors in which selected zones of LED light strips 162 are to be illuminated. A brightness selector 144 can be utilized to control the intensity and brightness of the LED light strips 162 (FIG. 5) of light source 160 (FIG. 3). A status light 140 can be lit in different colors to identify the current operating mode of the video frame analyzer 130 such as, but not limited to, power saving mode, video mode, music mode, ambient light mode, or to indicate that the LED lights are not connected. The video frame analyzer 130 can also include functionality for wireless communication with known wireless communication protocols for interfacing with a remote control 170. In such a manner a user can utilize the remote control 170 to operate the apparatus 110 instead of utilizing the manual controls on the video frame analyzer 130. The remote control 170 can be a dedicated unit or can be an application installed on a smart device such as a smart phone. The user can direct the video frame analyzer 130 to enter a mode wherein the analyzer 130 changes the color and intensity of the backlight without utilizing the data from the HDMI video stream. This can include predefined colors, color patterns, or other schemes that may be tied to time or sensors such as temperature, etc.

Figure 4:
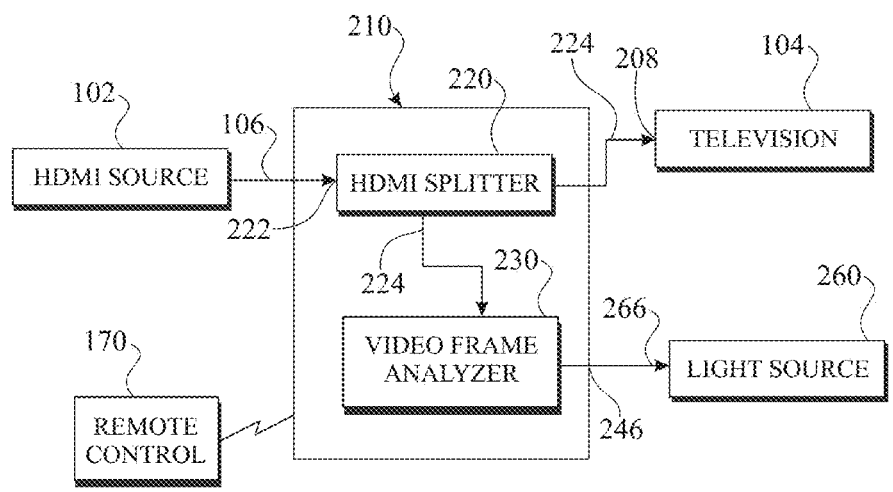
FIG. 4 presents a block diagram of an alternate embodiment backlight apparatus wherein the splitter and the video frame analyzer are housed in the same chassis.

As shown in FIG. 4, an alternate embodiment of the television backlighting apparatus 210 incorporates a single chassis (not shown) in which is housed the HDMI splitter 220 and the video frame analyzer 230. Other illustrated elements have been previously identified and like elements with respect to television backlighting apparatus 110 are identified with like reference numbers preceded by the numeral "2."

Referring to FIG. 3, the video frame analyzer 130 can also include an audio analysis function to analyze the audio stream component of the HDMI signal and translate the audio stream into visual colors and intensities. The video frame analyzer 130 separates the audio stream into a left channel 150 and a right channel 152. A left channel Fast Fourier Transform (FFT) 154 and a right channel FFT 156 can be utilized to analyze the spectrum of the audio. The analysis output is inputted to a frequency to light module 158 that translates the audio frequency to light signals, which are transmitted via the light source interface cable 166 to the light source 160 to create color schemes that are responsive to the frequencies and energy in the audio. Further, the video frame analyzer 130 may implement other known techniques to detect the beats, tempo, and genre of the music and control the light source 160 accordingly.

Figure 5:
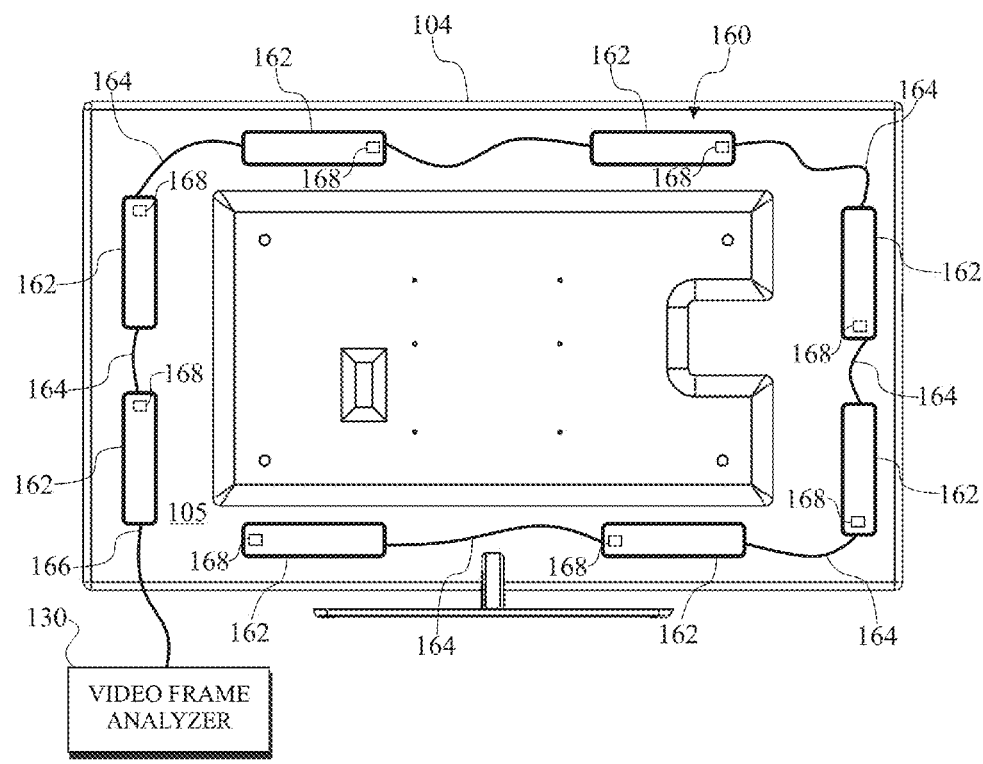
FIG. 5 presents a rear view of a television set having a plurality of LED light strips attached about a rear periphery.

Referring now to FIG. 5, the light source 160 has at least one LED light which is attachable to the rear surface 105 of the television 104. In the illustrated embodiment, a plurality of LED light strips 162 are adhered to the back surface 105 of the television 104 and extend proximately to the outer periphery of the television 104. The light strips 162 can utilize RGB LEDs for the reproduction of a spectrum of colored lighting. A first light strip 162 is connected to the video frame analyzer 130 with an interface cable 166 and subsequent LED light strips 162 are connected in series with LED interconnect cables 164. Alternatively, (not shown) each LED light strip 162 can be connected directly to the video frame analyzer 130 such that the LED light strips are interconnected with the video frame analyzer 130 in parallel in a manner well known in the art. Connecting the LED light strips 162 in series is more advantageous by reducing the number of wires required to connect to the video frame analyzer 130.

One or more of the LED light strips 162 can include a position sensor 168 for electrical identification of the position of the LED light strips 162 with respect to the back surface 105 the television 104, and the light source 160 can also communicate bidirectionally with the video frame analyzer 130 to communicate to the video frame analyzer 130 the number and position of the various zones. Such communication permits the video frame analyzer to relay the correct color and intensity data to an identified LED light strip in a particular corresponding zone. The LED light strips 162 can also communicate an electronic signal (digital or analog) to the video frame analyzer 130 to facilitate learning of the zonal positioning of individual LED light strips 162. The LED light strips 162 can also have non-volatile memory devices set to identify the number of zones with the intention that specific zones are used to serve predetermined sections of the backlighting.

In operation, referring again to FIG. 1, an HDMI signal containing video and audio streams is received by the HDMI splitter 120 from the HDMI source 102 over HDMI cable 106. The HDMI splitter 120 takes the HDMI stream and duplicates the HDMI stream into two identical HDMI outputs 124. This technique directly delivers the HDMI content to the television 104 via a first of the splitter HDMI outputs 124 and HDMI cable 108. A separate identical HDMI signal is routed from the second of the HDMI outputs 124 and is directed to the HDMI analyzer 130. The microprocessor 136 (FIG. 2) in the video frame analyzer 130 executes an instruction set stored on memory device 137 (FIG. 2) to convert the boundary values of the HDMI video signal to an LED data output signal.

The LED data output signal directs the LED light strips 162 to create backlighting in identified zones, thus illuminating in colors corresponding to the colors of the boundary of the video frame illuminated on the television screen. A zonal and addressable source permits the HDMI video frame analyzer 132 address content specific to a section of the television. A greater number of zones typically results in a higher resolution of the backlighting produced by the light source 160.

Figure 6:
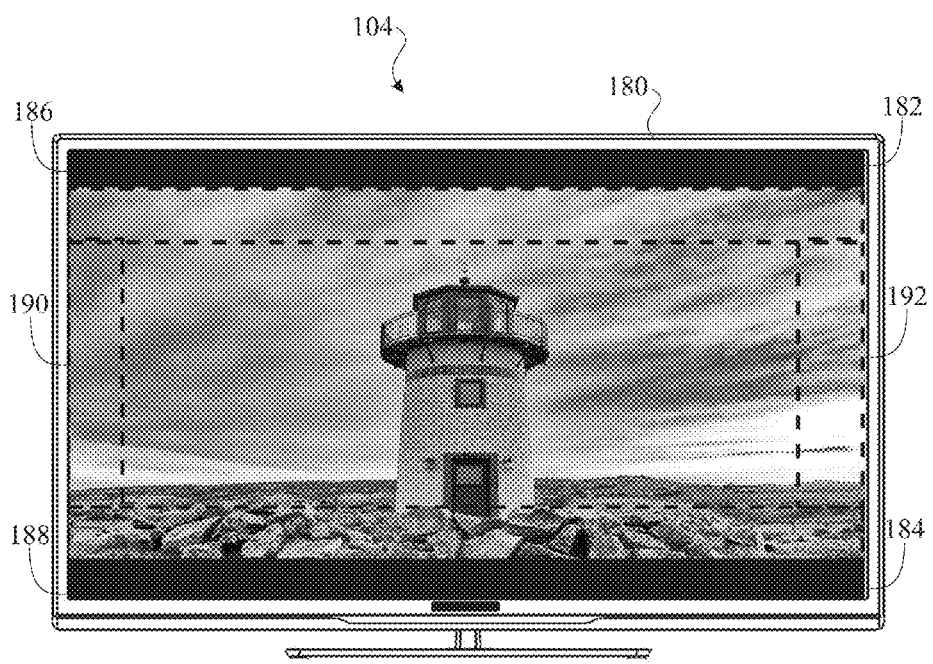
FIG. 6 presents a front view of a television illustrating the display of a widescreen video signal and the various screen regions associated therewith.

FIG. 6 illustrates the front screen 180 of the television 104. The video frame analyzer 130 can incorporate techniques to identify letterboxing when the video signal includes widescreen content. The letterboxing results in a top black bar 182 and a bottom black bar 184 being displayed on the front screen 180. When such widescreen content is broadcast, the video frame analyzer 130 redefines the sections of the video that are used to compute the backlight color signal transmitted to the light source 160. The video frame analyzer 130 can switch to this mode automatically based on the video stream of the detected or the user may manually direct the video frame analyzer 130 to do so. When this technique is utilized, the backlighting is generated from the outer periphery of the visual content of the widescreen data stream rather than the top and bottom black bars 182, 184. The outer periphery of the visual content includes upper and lower boundaries 186, 188 respectively and left and right side boundaries 190, 192 respectively.

The HDMI analyzer can also implement execution of an instruction set stored on the memory device 137 to provide color correction of the backlight color. The effect of the backlighting largely depends on the color of the surface (i.e. wall, cabinet, etc.) on which the illumination occurs. The video frame analyzer 130 can adjust the saturation values of the independent colors so that they match the visual content of the video from the television screen. Additionally, the video frame analyzer 130 can have a color sensor (not shown) to measure the backlight and automatically adjust the color so that the rendering on the surface being backlit is the same as the television.

Additional functionality contemplated for inclusion includes adjusting the brightness of the LED light strips as a function of the time of day wherein the time information may be provided in a variety of ways such as by a microprocessor application, check reprogramming, etc.

The apparatus 110 can automatically detect the number of zones or number of addressable points of light such as individual LEDs.

The apparatus 110 can automatically detect music from a network device and play visual content via the plurality of LEDs in the LED light strips 162. For example a cell phone or other wireless device can transmit the music information for audio visualization from outside broadcast sources.

The video frame analyzer 130 can detect content and match the LED light output signal to a database to create various lighting effects. For example, when a romantic movie is detected the video frame analyzer 130 can cause the LED light strips 162 to illuminate red or dark pink.

The apparatus 110 can include a motion sensor for automatically enabling modes. For example, ambient lighting can be turned on or off based on detected motion for a preset period of time and then return to standby power.

The video frame analyzer 130 can convert encrypted (or non-encrypted) high speed serial data from the HDMI signal stream into RGB data in formats such as 24-bit RGB, BT 656.

The video frame analyzer can use parallel data processing to collect data from the HDMI source 102, process the data and communicate it to the light source 160. HDMI is a high-speed protocol delivering large amounts of uncompressed data at high frame rates. The video frame analyzer 130 can be equipped with additional hardware to collect data from a frame while another piece of hardware may be processing and transmitting the data from the previous frame.

The apparatus 110 can synchronize with wireless devices such as cellular phones, tablets, etc. and provide alerts so that all telephone calls, alarms, calendar entries, messages, etc. are displayed via placing the light source 160 in a notification flashing mode.

Audio analysis component of the video frame analyzer 130 can identify the genre and tempo of music contained in the audio stream and can adjust the color palette to better suit the type of music being played. For example, dark blue tones can be displayed when listening to jazz or blues music, and bright pink and purple colors can be displayed for pop music, etc.

The memory device 137 of the video frame analyzer 130 may be non-volatile memory that retains the last settings of the apparatus 110, such that when power is returned to the apparatus 110, the apparatus 110 reverts to the previous operation mode and settings.

The memory device 137 of the video frame analyzer 130 can store accessible operation modes wherein the LED light data signal causes the light source 100 $0.60 a lighting show such as candlelight, fireplace, twinkling stars, etc.

The apparatus 110 can automatic detect and identify the source resolution and timing considerations of the HDMI signal input such as 720p, 1080p, 2k-4k, etc.

The apparatus 110 can have a programmable sleep/off mode which is programmable by the user.

The apparatus 110 can control the size of the target pixel area that is analyzed to compute a larger range of pixels from the video source.

The apparatus can implement an application to control the audio levels, and can adjust segmented audio channels such as bass, treble, etc.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A television backlighting apparatus for backlighting from an exterior portion of a television set, said television backlighting apparatus comprising:
   a High-Definition Multimedia Interface (HDMI) splitter for splitting a single input HDMI signal into two like output HDMI signals and having an HDMI signal input and at least a first HDMI signal output for connection of a first output HDMI signal to a television set and a second HDMI signal output for a second output HDMI signal;
   a video frame analyzer comprising
      a chassis,
      a power input housed by said chassis for connection to an external power source,
      a HDMI input housed by said chassis and connected to said second HDMI signal output of said HDMI splitter for receiving from said HDMI splitter said second output HDMI signal,
      an Light Emitting Diode (LED) light source output housed by said chassis,
      a power/mode selector housed by said chassis for on/off selection and for selecting one of a plurality of operational modes,
   a back light zone/color selector housed by said chassis for manually selecting backlighting zones and colors,
   a memory device housed by said chassis for storing executable instruction sets for analyzing signals, and
   a processor housed by said chassis and connected to said HDMI input for receiving the second output HDMI signal and to said memory device for receiving at least one of the executable instruction sets from said memory device, said processor being configured to execute the at least one of the instruction sets to:

analyze said second output HDMI signal received by said HDMI input, convert boundary video values of said second output HDMI signal to an LED illumination data signal, and provide said LED illumination data signal at said LED light source output; and an LED light source connected by an LED interface cable to said LED light source output of said video frame analyzer for receiving said LED illumination data signal and attachable exteriorly of the television set to an exterior portion of the television set.

2. The television backlighting apparatus according to claim 1 wherein said LED light source includes a plurality of LED light strips attachable exteriorly of the television set to an exterior peripheral portion of the television set.

3. The television backlighting apparatus according to claim 2 wherein each said LED light strip is located in at least one of said zone.

4. The television backlighting apparatus according to claim 3 wherein said LED light source further includes at least one sensor to identify the zone position of each said LED light strip.

5. The television backlighting apparatus according to claim 3 wherein said LED light source further includes a memory device storing the number of zones and which zone serves a predetermined section of backlighting.

6. The television backlighting apparatus according to claim 5 wherein said memory device is non-volatile and retains apparatus settings when power is removed from said backlighting apparatus.

7. The television backlighting apparatus according to claim 1 further comprising a brightness selector housed by said chassis and operable to control intensity and brightness of the backlighting provided by said LED light source.

8. A video frame analyzer of a television backlighting apparatus for backlighting from an exterior portion of a television set, said video frame analyzer comprising:
   a chassis;
   a power input housed by said chassis for connection to an external power source;
   a High-Definition Multimedia Interface (HDMI) input housed by said chassis for receiving from a HDMI splitter one of two like output HDMI signals split from a single input HDMI signal received by the HDMI splitter, the other of the two like output HDMI signals for connection to a television set;
   an Light Emitting Diode (LED) light source output housed by said chassis being connectable by an LED interface cable to an LED light source providing backlighting from an exterior portion of the television set;
   a power/mode selector housed by said chassis for on/off selection and for selecting one of a plurality of operational modes;
   a back light zone/color selector housed by said chassis for manually selecting backlight zones and colors of the LED light source are to be illuminated;
   a memory device housed by said chassis for storing executable instruction sets for analyzing signals; and
   a processor housed by said chassis and connected to said HDMI input for receiving the one output HDMI signal and to said memory device for receiving at least one of the executable instruction sets from said memory device, said processor being configured to execute the at least one of the instruction sets to:

analyze the one output HDMI signal received by said HDMI input, convert boundary video values of the one output HDMI signal to an LED illumination data signal, and provide said LED illumination data signal at said LED light source output connectable to an LED light source to provide backlighting from the exterior portion of the television set.

9. The video frame analyzer according to claim 8 further comprising a brightness selector housed by said chassis and operable to control intensity and brightness of the backlighting from the exterior portion of the television set provided by LED light source.

10. The video frame analyzer according to claim 8, further comprising a status light housed by said chassis capable of lighting in different colors to identify the selected one of the operational modes currently operating.

11. The video frame analyzer according to claim 8, further comprising:
   right and left channels for receiving an audio stream component of the one output HDMI signal receiving by the HDMI input and configured for separating into respective right and left channel audio stream components; and
   right and left channel Fast Fourier Transforms for receiving the respective right and left channel audio stream components and analyzing the spectrum thereof so as to translate audio frequencies thereof to light signals transmittable to the LED light source via the LED interface cable connectable to said LED light source output.

12. The video frame analyzer according to claim 8 further comprising a wireless communication function communicative with a remote device for using the remote device to control on/off selection and operational mode selection instead of using said power/mode selector.

13. A method for backlighting from an exterior portion of a television set, said method including the steps:
   acquiring a backlighting apparatus of the type including a High-Definition Multimedia Interface (HDMI) splitter for splitting a single input HDMI signal into two like output HDMI signals, a video frame analyzer connected to the HDMI splitter for receiving one of the output HDMI signals and producing a Light Emitting Diode (LED) illumination data signal, and an LED light source interconnected to the video frame analyzer, the LED light source being located exteriorly of a television set and attachable to the exterior portion of the television set;
   attaching the LED light source to the exterior portion of the television set;
   connecting a power input of the video frame analyzer to an external power source;
   turning on the video frame analyzer and selecting an operational mode for the video frame analyser by using a power/mode selector on the video frame analyzer;
   selecting backlighting zones and colors by using a back light zone/color selector on the video frame analyzer;
   receiving, by the HDMI splitter, an HDMI television signal;
   splitting, by the HDMI splitter, the HDMI signal into a first HDMI signal and an identical second HDMI signal;
   routing the first HDMI signal from the HDMI splitter to the television set;
   routing the second HDMI signal from the HDMI splitter to the video frame analyzer;

analyzing the second HDMI signal, by the video frame analyzer employing a processor executing an instruction set;

converting, by the processor of the video frame analyzer, boundary video values of the second HDMI signal to the LED illumination data signal; and outputting the LED illumination data signal from the video frame analyzer to the LED light source to provide backlighting from the exterior portion of the television set.

14. The method for backlighting the television set according to claim 13 further comprising after said analyzing step, the step of computing, by the video frame analyzer, a backlight color from a color of a border of a television screen of the television set.

15. The method for backlighting the television set according to claim 14 further comprising after said analyzing step, the step of identifying, by the video frame analyzer, letter-boxing of a widescreen data stream in the second HDMI signal.

16. The method for backlighting the television set according to claim 15 further comprising after said identifying step, the step of automatically redefining the sections of the second HDMI signal used to compute the backlight color to that of the border of the visual content of the widescreen data stream.

17. The method for backlighting the television set according to claim 15 further comprising after said identifying step, the step of manually initiating redefinition of the backlight color computation to that of the sections of the second HDMI signal from the border of the visual content of the widescreen data stream.

18. The method for backlighting the television set according to claim 14 further comprising after said converting step, the step of correcting, by the video frame analyzer, a backlight color to compensate for an existing color of a surface on which backlight illumination occurs.

19. The method for backlighting the television set according to claim 13 wherein said analyzing step comprises employing an instruction set to analyze, by the video frame analyzer, an audio stream of the second HDMI signal and wherein said converting step comprises converting the audio stream to visual colors and intensities.

20. The method for backlighting the television set according to claim 19 wherein said analyzing step comprises employing Fast Fourier Transforms, by the video frame analyzer, to analyze the spectrum of the audio stream and wherein said converting step comprises creating color schemes responsive to frequencies and energy in the audio signal.

* * * * *